(12) United States Patent
Lin et al.

(10) Patent No.: US 12,095,708 B2
(45) Date of Patent: Sep. 17, 2024

(54) WIRELESS COMMUNICATION METHOD AND USER EQUIPMENT FOR TRANSMISSION ON DIFFERENT BANDWIDTH PARTS

(71) Applicant: FG Innovation Company Limited, Tuen Mun (HK)

(72) Inventors: Wan-Chen Lin, Taipei (TW); Hai-Han Wang, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 152 days.

(21) Appl. No.: 17/508,371

(22) Filed: Oct. 22, 2021

(65) Prior Publication Data
US 2022/0131677 A1    Apr. 28, 2022

Related U.S. Application Data

(60) Provisional application No. 63/105,170, filed on Oct. 23, 2020.

(51) Int. Cl.
*H04L 5/00* (2006.01)
*H04W 72/23* (2023.01)

(52) U.S. Cl.
CPC .......... *H04L 5/0092* (2013.01); *H04L 5/0032* (2013.01); *H04L 5/0096* (2013.01); *H04W 72/23* (2023.01)

(58) Field of Classification Search
CPC ... H04L 5/0092; H04L 5/0032; H04L 5/0096; H04W 72/23
See application file for complete search history.

(56) References Cited

U.S. PATENT DOCUMENTS

| | | | |
|---|---|---|---|
| 2019/0149213 A1* | 5/2019 | Zhou | H04L 5/0092 370/329 |
| 2019/0149305 A1* | 5/2019 | Zhou | H04W 72/23 370/330 |
| 2020/0107308 A1 | 4/2020 | Liao et al. | |

(Continued)

FOREIGN PATENT DOCUMENTS

| | | |
|---|---|---|
| CN | 111373789 | 7/2020 |
| WO | 2020033395 | 2/2020 |

OTHER PUBLICATIONS

Lenovo, Motorola Mobility, UE behavior upon consistent LBT failure, 3GPP TSG-RAN WG2 Meeting #109e, Feb. 24-Mar. 6, 2020, R2-2000822.

(Continued)

*Primary Examiner* — Shukri Taha
(74) *Attorney, Agent, or Firm* — ScienBiziP, P.C.

(57) ABSTRACT

A wireless communication method, performed by a User Equipment, for transmission on different BandWidth Parts (BWPs) includes receiving, a radio resource control (RRC) message configuring a first Physical Uplink Control CHannel-Configuration (PUCCH-Config) for a first UpLink (UL) BandWidth Part (BWP) of a first cell and a second PUCCH-Config for a second UL BWP of a second cell; receiving, from the first cell, Downlink Control Information (DCI) including fields to indicate a duration and a switching indication; and transmitting a PUCCH on the second UL BWP after receiving the DCI if the switching indication indicates the second cell.

8 Claims, 7 Drawing Sheets

| first | carrier #0 | PDSCH | | | | | | | k1=2 |
|---|---|---|---|---|---|---|---|---|---|
| second | carrier #1 | | | | | | PUCCH | | k1=3 |
| third | carrier #2 | | | | | | | | k1=5 |

(56) References Cited

U.S. PATENT DOCUMENTS

| | | | | |
|---|---|---|---|---|
| 2020/0145169 A1* | 5/2020 | Zhou | .................... | H04W 76/27 |
| 2020/0305168 A1* | 9/2020 | Liou | .................... | H04W 76/11 |
| 2021/0351875 A1* | 11/2021 | Babaei | ................ | H04L 1/1874 |
| 2021/0360594 A1* | 11/2021 | Park | .................... | H04B 7/0695 |
| 2023/0217456 A1* | 7/2023 | Yi | ........................ | H04L 5/0094 |
| | | | | 370/329 |

OTHER PUBLICATIONS

Qualcomm Incorporated, Finalize dormant BWP, 3GPP TSG RAN WG2 Meeting #110-e, E-Conference, Jun. 1-12, 2020, R2-2004809.
3rd Generation Partnership Project; Technical Specification Group Radio Access Network; NR; Physical layer procedures for data (Release 16); 3GPP TS 38.214 V16.3.0 (Sep. 2020).

* cited by examiner

| symbol # | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| carrier #0 | D | D | D | D | D | D | D | D | D | D | D | D | F | U |
| carrier #1 | D | D | D | F | F | F | U | U | U | U | U | U | U | U |
| carrier #2 | D | F | U | U | U | U | U | U | U | U | U | U | U | U |

WIRELESS COMMUNICATION METHOD AND USER EQUIPMENT FOR TRANSMISSION ON DIFFERENT BANDWIDTH PARTS

CROSS-REFERENCE TO RELATED APPLICATION(S)

The present disclosure claims the benefit of and priority to provisional U.S. Patent Application Ser. No. 63/105,170 ("the '170 provisional"), filed on Oct. 23, 2020, entitled "METHOD AND APPARATUS FOR SCHEDULING PUCCH BETWEEN DIFFERENT COMPONENT CARRIERS". The contents of the '170 provisional are hereby fully incorporated herein by reference for all purposes.

FIELD

The present disclosure is generally related to wireless communications, and specifically, to a wireless communication method and a user equipment for transmission on different BandWidth Parts (BWPs).

BACKGROUND

With the tremendous growth in the number of connected devices and the rapid increase in user/Network (NW) traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the NW services and types, accommodating various use cases such as Enhanced Mobile Broadband (eMBB), Massive Machine-Type Communication (mMTC), and Ultra-Reliable and Low-Latency Communication (URLLC).

However, as the demand for radio access continues to increase, there is a need in the art to perform transmission on different BandWidth Parts (BWPs).

SUMMARY

The present disclosure is directed to methods and user equipment (UE) for transmission on different BandWidth Parts (BWPs).

In a first aspect of the present disclosure, a method performed by a User Equipment (UE) for transmission on different BandWidth Parts (BWPs) is provided. The method includes receiving, a radio resource control (RRC) message configuring a first Physical Uplink Control CHannel-Configuration (PUCCH-Config) for a first UpLink (UL) BWP of a first cell and a second PUCCH-Config for a second UL BWP of a second cell; receiving, from the first cell, Downlink Control Information (DCI) including fields to indicate a duration and a switching indication; and transmitting a PUCCH on the second UL BWP after receiving the DCI if the switching indication indicates the second cell.

In another implementation of the first aspect, the duration is based on at least a Sub-Carrier Spacing (SCS) configuration of the second UL BWP and indicates an offset value between a Physical Downlink Share CHannel (PDSCH) scheduled by the DCI and the PUCCH transmission in time domain.

Another implementation of the first aspect further comprises transmitting a UE capability message to indicate whether the UE supports transmitting the PUCCH on the second UL BWP after receiving the DCI.

In another implementation of the first aspect, one of the fields of the DCI further indicates an Index (ID) of the second cell as the switching indication.

In another implementation of the first aspect, the first cell is a Primary Cell (PCell), the second cell is a Secondary Cell (SCell), and the first cell and the second cell are within a same PUCCH cell group.

In a second aspect of the present disclosure, a User Equipment (UE) in a wireless communication system for transmission on different BandWidth Parts (BWPs) is provided. The UE includes a processor; and a memory coupled to the processor, wherein the memory stores a computer-executable program that, when executed by the processor, causes the processor to receive, a radio resource control (RRC) message configuring a first Physical Uplink Control CHannel-Configuration (PUCCH-Config) for a first UpLink (UL) BWP of a first cell and a second PUCCH-Config for a second UL BWP of a second cell; receive, from the first cell, Downlink Control Information (DCI) including fields to indicate a duration and a switching indication; and transmit a PUCCH on the second UL BWP after receiving the DCI if the switching indication indicates the second cell.

BRIEF DESCRIPTION OF THE DRAWINGS

Aspects of the present disclosure are best understood from the following when read with the accompanying figures. Various features are not drawn to scale. Dimensions of various features may be arbitrarily increased or reduced for clarity of discussion.

FIG. 1 illustrates a schematic diagram for different carriers with different UL/DL patterns according to an implementation of the present disclosure.

FIG. 5 illustrates a schematic diagram for the parameter K1 based on different SCS configuration according to an implementation of the present disclosure.

DESCRIPTION

Figure 2:
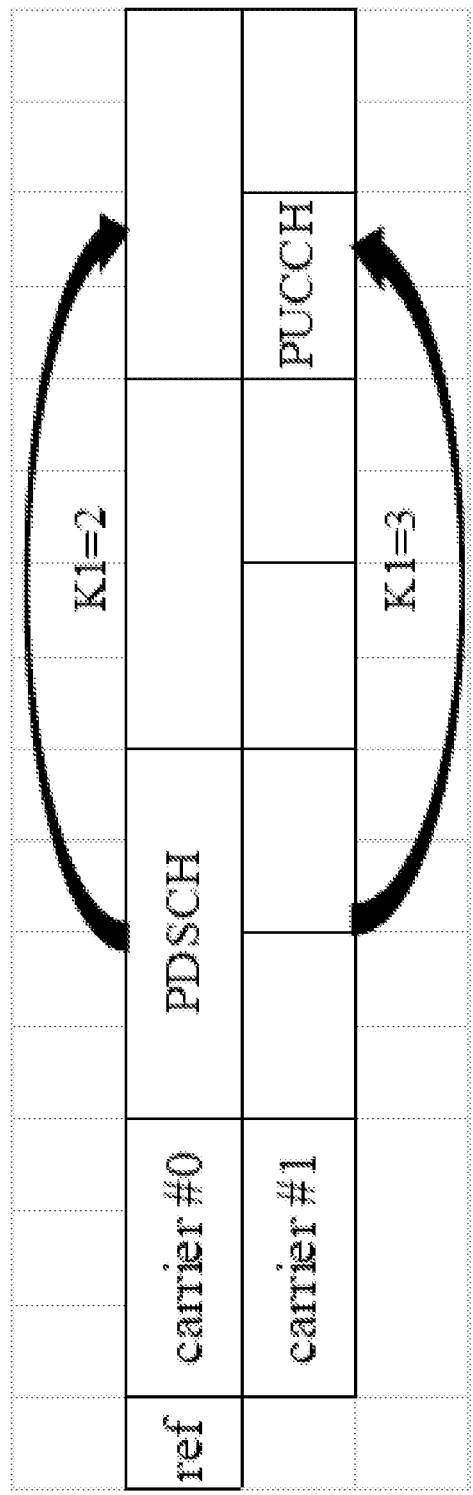
FIG. 2 illustrates a schematic diagram for the parameter K1 based on the reference carrier according to an implementation of the present disclosure.

The acronyms in the present disclosure are defined as follows. Unless otherwise specified, the acronyms have the following meanings.

Acronym Full name
3GPP 3$^{rd}$ Generation Partnership Project
5G 5th generation
ACK Acknowledgement
AR Augmented Reality
BS Base Station
BWP BandWidth Part
CA Carrier Aggregation CC Component Carrier
CE Control Element
CN Core Network
C-RNTI Cell-Radio Network Temporary Identifier
DAI Downlink Assignment Index
DC Dual Connectivity
DCI Downlink Control Information
DL Downlink
FR1/2 Frequency Range 1/2
GC-PDCCH Group Common-Physical Downlink Control Channel
gNB g Node B
HARQ Hybrid Automatic Repeat Request
ID Index
IE Information Element
IIoT Industrial Internet of Things
LSB Least Significant Bit
LTE Long Term Evolution
L1 Layer 1
MAC Medium Access Control
MCG Master Cell Group
MCS-C-RNTI Modulation Coding Scheme-Cell-Radio Network Temporary Identifier
MIMO Multi-Input Multi-Output
MSB Most Significant Bit
NACK Negative Acknowledgement
NDI New Data Indicator
NR New Radio
NW Network
PCell Primary Cell
PSCell Primary Secondary Cell
PBCH Physical Broadcast Channel
PDCCH Physical Downlink Control Channel
PDSCH Physical Downlink Shared Channel
PUCCH Physical Uplink Control Channel
PUSCH Physical Uplink Shared Channel
PDU Protocol Data Unit
PHY Physical
PTAG Primary Timing Advance Group
RAN Radio Access Network
Rel Release
RMSI Remaining Minimum System Information
RNTI Radio Network Temporary Identifier
RRC Radio Resource Control
RV Redundancy Version
SCell Secondary Cell
SCG Secondary Cell Group
SCS Subcarrier Spacing
SFI Slot Format Indicator
SI System Information
SpCell Special Cell
SLIV Start and Length Indicator Value
SPS Semi-Persistent Scheduling
SR Scheduling Request
SRS Sounding Reference Signal
SSB Synchronization Signal Block
STAG Secondary Timing Advance Group
SUL Supplementary Uplink
TAG Timing Advance Group
TB Transport Block
TBS Transport Block Size
TCI Transmission Configuration Indicator
TDD Time Division Duplex
TR Technical Report
TS Technical Specification
TTI Transmission Time Interval
TX Transmission
UCI Uplink Control Information
UE User Equipment
UL Uplink
UL-SCH Uplink Shared Channel
URLLC Ultra Reliable Low Latency Communication
USS UE-Specific Search Space
WG Working Group
WI Working Item
QCL Quasi Co-Location The following contains specific information pertaining to implementations of the present disclosure. The drawings and their accompanying detailed disclosure are directed to merely exemplary implementations. However, the present disclosure is not limited to these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and, therefore, shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrases "in one implementation," "in an example implementation," or "an implementation," do not necessarily refer to the same implementation, although they may. Moreover, any use of phrases such as "implementations" in connection with "the present disclosure" are not meant to characterize that all implementations of the present disclosure must include the particular feature, structure, or characteristic, and should instead be understood to mean "at least some implementations of the present disclosure" includes the stated particular feature, structure, or characteristic.

The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-disclosed combination, group, series, and the equivalent.

The term "and/or" is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" generally represents that the former and latter associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may comprise computer-executable instructions stored on computer-readable media such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations in the present disclosure are directed to software installed and executing on computer hardware, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a LTE system, an LTE-Advanced (LTE-A) system, or an LTE-Advanced Pro system) typically includes at least one BS, at least one UE, and one or more optional NW elements that provide connection towards an NW. The UE communicates with the NW (e.g., a CN, an Evolved Packet Core (EPC) NW, an Evolved Universal Terrestrial Radio Access NW (E-UTRAN), a Next-Generation Core (NGC), a 5G Core Network (5GC), or an Internet), through a RAN established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM Enhanced Data rates for GSM Evolution (EDGE) Radio Access NW (GERAN), a Next Generation eNB (ng-eNB) as in an E-UTRA BS in connection with the 5GC, a gNB as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the DL and, optionally, UL resources to at least one UE within its radio coverage for DL and, optionally, UL packet transmissions). The BS may communicate with one or more UEs in the radio communication system through the plurality of cells. A cell may allocate sidelink (SL) resources for supporting proximity service (ProSe). Each cell may have coverage areas overlapped with other cells.

In Multi-RAT Dual Connectivity (MR-DC), the primary cell of an MCG or a SCG may be called as a SpCell. A PCell may refer to the SpCell of an MCG. A PSCell may refer to the SpCell of an SCG. MCG refers to a group of serving cells associated with the Master Node (MN), comprising the SpCell and, optionally, one or more SCells. SCG refers to a group of serving cells associated with the Secondary Node (SN), comprising of the SpCell and, optionally, one or more SCells.

In some implementations, the UE may not have (LTE/NR) RRC connections with the corresponding serving cells of the associated services. In other words, the UE may not have UE-specific RRC signaling exchange with the serving cell. Instead, the UE may only monitor the DL synchronization signals (e.g., DL synchronization burst sets) and/or broadcasting SI related to the corresponding services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next generation (e.g., 5G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

It is also considered that in a transmission time interval of a single NR frame, at least DL transmission data, a guard period, and UL transmission data should be included. The corresponding portions of the DL transmission data, the guard period, the UL transmission data should also be configurable, for example, based on the NW dynamics of NR. In addition, SL resources may also be provided in an NR frame to support ProSe services.

Some technical terms are introduced in the following:

HARQ: a functionality may ensure delivery between peer entities at Layer 1 (i.e., PHY Layer). A single HARQ process may support one TB when the PHY layer is not configured for DL/UL spatial multiplexing. When the PHY layer is configured for DL/UL spatial multiplexing, a single HARQ process may support one or multiple TBs. There may be one HARQ entity per serving cell. Each HARQ entity may support parallel (number of) DL and UL HARQ process(es).

PUCCH: in 3GPP NR Rel-15 and Rel-16 specification, the NW may configure a parameter PUCCH-Config on at least a non-initial BWP for one SpCell and one PUCCH SCell, where the PUCCH SCell refers to an SCell configured with one PUCCH. If it is supported by the UE, the NW may configure at most one additional SCell of a cell group with the PUCCH-Config, where a PUCCH configuration may be configured for one BWP of the normal UL or SUL of a serving cell. If the UE is configured with the SUL, the NW may configure only one PUCCH on the BWPs of one of the ULs (e.g., normal UL or SUL). In other words, the PUCCH may be transmitted on one serving cell in a PUCCH cell group. If the UE is configured with one PUCCH-SCell, the UE may apply the corresponding PUCCH transmission for both a primary PUCCH group and a secondary PUCCH group. Furthermore, the NW may configure an ID of the serving cell of the same cell group to use for the PUCCH by using a field pucch-Cell in PDSCH-ServingCellConfig. If the field is absent, the UE may send HARQ feedback on the PUCCH of the SpCell of this cell group, or on this serving cell if it is a PUCCH SCell.

URLLC: in 3GPP Rel-15 specification, the basic support for URLLC is introduced with TTI structures for low latency as well as methods for improved reliability. Other usage cases with tighter requirements have been identified as important for NR evolution, in addition to the need for enhancing Rel-15 enabled usage cases. In some implementations, the following usage cases may be considered:

Rel-15 enabled usage case improvements, such as entertainment industry (e.g., AR and/or VR).

New Rel-16 usage cases with higher requirements, such as factory automation, transport industry (e.g., remote driving usage case), and electrical power distribution.

Some problems with solutions are introduced in the following.

Providing HARQ Latency Reduction with CA in Unpaired Spectrum

Since only a few UL symbols are available to transmit the HARQ-ACK information in a DL-heavy TDD configuration, it may be hard to meet the low latency requirement of a URLLC scenario. Although different serving cells may have different UL/DL patterns, only one PUCCH may be transmitted on a configured serving cell in one PUCCH cell group. In other words, PUCCH transmission may be semi-statically configured in a specific serving cell, and its latency may be highly dependent on UL/DL patterns for the serving cell because related dynamic PUCCH carrier switching is not yet available. Therefore, it is important to achieve dynamic PUCCH carrier switching with proper solutions.

In one implementation, lists of serving cells for use with one PUCCH may be configured by a higher layer, and a DCI field may be used to indicate on which serving cell the PUCCH is transmitted. In another implementation, lists of serving cells for use with one PUCCH may be configured by a higher layer, and a MAC CE may be used to indicate on which serving cell the PUCCH is transmitted. In another implementation, a UE capability for supporting dynamic PUCCH carrier switching may be reported, and a DCI field may be used to indicate on which serving cell the PUCCH is transmitted. In another implementation, a UE capability for supporting dynamic PUCCH carrier switching may be reported, and a MAC CE may be used to indicate on which serving cell the PUCCH is transmitted. In another implementation, a MAC CE may be used to indicate the activation/deactivation for one PUCCH carrier on each serving cell. In another implementation, a MAC CE may be used to indicate the PUCCH carrier for PUCCH transmission. In another implementation, if a slot indicated by a HARQ timing indicator has no available PUCCH resource(s), dynamic PUCCH carrier switching may be applied. In another implementation, two types of PUCCH cells may be provided, where one may be a semi-static type and the other be a dynamic type.

HARQ-ACK Timing

A parameter duration K1 between one given PDSCH and HARQ-ACK may be indicated by dl-DataToUL-ACK or dl-DataToUL-ACK-DCI-1-2-r16 or a PDSCH-to-HARQ timing indicator field in a corresponding DCI format, and the field may map to values for a set of a number of slots/subslots. Furthermore, a parameter SCS configuration K1 is based on the SCS configuration of the serving cell where one PUCCH is configured. Therefore, if dynamic PUCCH carrier switching is applied, a reference SCS configuration for the duration K1 may be unclear.

In one implementation, the duration between one given PDSCH and an associated PUCCH transmission may apply a reference carrier with SCS configuration µ. In another implementation, the duration between one given PDSCH and an associated PUCCH transmission may apply the PUCCH carrier with SCS configuration µ1 before dynamic PUCCH carrier switching. In another implementation, the duration between one given PDSCH and an associated PUCCH transmission may apply the PUCCH carrier with SCS configuration µ2 after the dynamic PUCCH carrier switching. In another implementation, the duration between one given PDSCH and an associated PUCCH transmission may be based on an active BWP in the serving cell with a smallest SCS configuration. In another implementation, the duration between one given PDSCH and an associated PUCCH transmission may be based on an active BWP in the serving cell with a largest SCS configuration.

PUCCH Carrier Switching Procedure

The dynamic PUCCH carrier switching may have some impact on a PUCCH multiplexing procedure if a definition of a switching point is unclear. For example, if a UE transmits overlapping UL channels in a time domain, the switched PUCCH may become non-overlapped with other channels, and accordingly, the PUCCH multiplexing procedure may need to be adjusted.

In one implementation, if a UE detects a DCI format scheduling one PUCCH in a first PUCCH carrier that may overlap with another PUCCH/PUSCH, the UE may not expect to switch the PUCCH carrier. More specifically, whenever one PUCCH carrier switching indication is received, the UE may ignore the PUCCH carrier switching indication if the overlapped PUCCH is scheduled. In another implementation, when a UE determines to resolve overlapping for PUCCH and/or PUSCH transmissions, the UE may check availability of PUCCH carrier switching in advance. More specifically, the UE may expect to switch a PUCCH carrier before resolving the overlapped UL transmissions. In another implementation, when a UE receives the PUCCH carrier switching indication, it may be one definitive and exact switching point. In another implementation, when a UE receives the PUCCH carrier switching indication, it may be one switching duration.

For more detailed descriptions, the dynamic PUCCH carrier switching is introduced in the following. In one implementation, lists of serving cells for use with a PUCCH may be configured by a higher layer, or/and a DCI field may be used to indicate on which serving cell the PUCCH is transmitted. In one example, the list may correspond to different groups. More specifically, a first list may correspond to a primary PUCCH cell group, and a second list may correspond to a secondary PUCCH cell group. In one example, a list may correspond to a new RRC parameter, e.g., primary PUCCH group list and/or secondary PUCCH group list. In one example, the lists may include IDs of serving cells. More specifically, list 1 may include serving cell ID {#0, #2, #4}, and list 2 may include serving cell ID {#1, #3, #5}. In one example, the list may correspond to a mapping table. More specifically, the first row (e.g., ID 0) in the table may correspond to serving cell ID 1, and the second row (e.g., ID1) may correspond to serving cell ID 3. In one example, the serving cell IDs in each list may be independent. More specifically, the serving cell ID included in the first list and the serving cell ID in the second list may not be the same. For instance, list 1/group 1 may include serving cell ID {#0, #1, #3}, and list 2/group 2 may include serving cell ID {#2, #4}. In other words, the serving cell ID #0, #1, and #3 in list 1 may not be configured or included in list 2. In one example, the serving cell IDs in each list may be dependent. More specifically, the serving cell ID in the first list and the serving cell ID in the second list may be the same. For instance, list 1/group 1 may include serving cell ID {#0, #1, #3}, and list 2/group 2 may include serving cell ID {#1, #4}. In other words, the serving cell ID #1 may be configured or included in list 1 and list 2. In one example, the DCI field used to indicate the switched PUCCH carrier may be a new field in an existing DCI format or a new DCI format. In one example, the DCI field used to indicate the switched PUCCH carrier may reuse an existing field in an existing DCI.

In one implementation, lists of serving cells for use with a PUCCH may be configured by higher layer and/or a MAC CE may be used to indicate on which serving cell the PUCCH is transmitted. In one example, the MAC CE may include bitfields for the ID of a list, ID of a group, an ID of serving cell, and/or the activation/deactivation mode for each serving cell. More specifically, a bitmap '0' may indicate deactivation, and a bitmap '1' may indicate activation. Alternatively, the bitmap '1' may indicate deactivation, and the bitmap '0' may indicate activation.

In one implementation, a UE capability for supporting the dynamic PUCCH carrier switching may be reported, a parameter related to one PUCCH carrier may be configured, and/or a DCI field may be used to indicate on which serving cell the PUCCH is transmitted. In one example, a parameter (e.g., dynamicPUCCHswitching-enable) may be used to enable dynamic switching. Furthermore, if the parameter is configured, the DCI may be used to indicate the specific serving cell on which the PUCCH can be transmitted. In one example, the bitfield of the DCI field may correspond to the serving cell ID. More specifically, a bitfield '10' may indicate that one PUCCH carrier switches to the PUCCH cell #2. In one example, the bitfield of the DCI field may correspond to the row ID of a mapping table for the list. More specifically, the bitfield '10' may indicate that one PUCCH carrier switches to a serving cell corresponding to the ID '10'. In one example, whether or not the parameter related to the PUCCH carrier switching is configured may be determined according to the UE capability. More specifically, the parameter may refer to a list, a PUCCH cell ID, or/and a PUCCH group ID.

In one implementation, the UE capability for supporting the dynamic PUCCH carrier switching may be reported, a parameter related to one PUCCH carrier may be configured, and/or a MAC CE may be used to indicate on which serving cell the PUCCH is transmitted. In one example, a parameter (e.g., dynamicPUCCHswitching-enable) may be used to enable dynamic switching. Furthermore, if the parameter is enabled, the MAC CE may be used to further indicate the PUCCH carrier. The MAC CE may include the ID of serving cell, and/or the activation/deactivation mode for each serving cell. More specifically, the bitmap '0' may indicate deactivation, and the bitmap '1' may indicate activation. Alternatively, the bitmap '1' may indicate deactivation, and the bitmap '0' may indicate activation.

In one implementation, a MAC CE may be used to indicate the activation/deactivation for one PUCCH carrier. More specifically, the activated carrier may be the carrier on which the PUCCH may be transmitted, and the deactivated carrier may be the carrier not transmitting any PUCCH (e.g., PUCCH transmission). In one example, one deactivated PUCCH carrier may not be expected to be scheduled for a PUCCH transmission. In one example, the MAC CE may include fields, such as serving cell ID, BWP ID, and/or indication of activation/deactivation field(s). In one example, the PUCCH carrier(s) included in the MAC CE may be the configured candidate PUCCH carrier(s). More specifically, at least one activation/deactivation bit may correspond to each candidate PUCCH carrier.

In one implementation, a MAC CE may be used to indicate one PUCCH carrier for transmitting the PUCCH transmission. In one example, the MAC CE may include fields, such as target(s) of for switching PUCCH cell ID, and/or BWP ID.

In one implementation, if a slot indicated by a HARQ timing indicator has no available resource for PUCCH transmission, dynamic PUCCH carrier switching may be applied. More specifically, if the indicator indicates PUCCH transmission to be transmitted in a slot without an available resource, a first PUCCH carrier may switch to a second PUCCH carrier with an available PUCCH resource. It is noted that an available resource for PUCCH transmission may UL symbols, flexible symbols without collision, and/or appropriate PUCCH formats. In one example, the dynamic PUCCH carrier switching may be applied only when the PUCCH resource for initial transmission of the PUCCH is not available. In one example, a first PUCCH carrier may be switched to a second PUCCH carrier within a same PUCCH group with the smallest serving cell ID. More specifically, if a PUCCH group includes a serving cell ID {#0, #1, #3}, a first PUCCH carrier is the serving cell ID #0 and a second PUCCH carrier may be the serving cell ID #1 while initiating dynamic switching. In other words, the order for selecting PUCCH carrier candidates may depend on the serving cell ID and the PUCCH group. In one example, a first PUCCH carrier may be switched to a second PUCCH carrier corresponding to the smallest serving cell ID regardless of whether two carriers are within the same PUCCH group. More specifically, if a first PUCCH group includes serving cell ID {#0, #2, #3} and a second PUCCH group includes serving cell ID {#1, #4}, the second PUCCH carrier may be serving cell ID #1 in the second PUCCH group. In other words, the order for selecting PUCCH carrier candidates may depend on the serving cell ID.

In one example, the second PUCCH carrier may be determined based on the carrier with the earliest available resource for PUCCH transmission. Please refer to FIG. 1, which illustrates a schematic diagram for different carriers with different UL/DL patterns according to an implementation of the present disclosure. In FIG. 1, 'D' represents that an available DL resource(s) exists, 'U' represents that an available UL resource(s) exists, and 'F' represents flexible resources that can be used for either UL transmission or DL reception. As shown in FIG. 1 with such exemplary UL/DL patterns of different carriers, if one first PUCCH carrier is carrier #0, then one second PUCCH carrier may be carrier #2 since the UL symbol in carrier #2 is the earliest available UL resource among all carriers.

In one example, the second PUCCH carrier may depend on whether a sub-slot configuration is configured. More specifically, if a parameter subslotLengthForPUCCH-r16 is configured in an active BWP for carrier #2 instead of carrier #1, the second PUCCH carrier may be carrier #2.

In one example, the second PUCCH carrier may be determined based on a carrier with the earliest available resource for transmitting the PUCCH, and subslotLength-ForPUCCH-r16 in PUCCH-Config of the active UL BWP of the carrier is the same as subslotLengthForPUCCH-r16 in the PUCCH-Config of the active UL BWP of the SpCell or as PUCCH-SCell in the same cell group.

In one example, the second PUCCH carrier may depend on whether more than one PUCCH configuration is configured as the PUCCH-Config. More specifically, if an active BWP in the second carrier with PUCCH-ConfigurationList indicates more than one PUCCH-Config is present, the first PUCCH carrier may be switched to the second carrier.

In one example, a first PUCCH carrier may be switched to a second PUCCH carrier with the most UL symbols in every period. As shown in the FIG. 1 with such exemplary UL/DL patterns of different carriers, one second PUCCH carrier may be carrier #2 since carrier #2 has the most UL symbols in a slot. In one example, the period may a slot, a plurality of symbols, a plurality of slots, a SFI periodicity, a pre-defined duration, and/or duration of TDD-UL-DL-Config.

In one implementation, two types of indicating PUCCH cells may be provided, where one may correspond to the semi-static type, and the other may correspond to the dynamic type. More specifically, a parameter may indicate to which type the UE may apply. If the parameter is set to {semi-static}, the UE may transmit the PUCCH on the specific PUCCH cell configured by higher layer; alternatively, if the parameter is set to {dynamic}, the UE may apply the dynamic PUCCH carrier switching (e.g., use at least one DCI).

In one example, the dynamic type may be configured only if the UE capability for supporting the dynamic PUCCH carrier switching is reported. In one example, the dynamic type may be scheduled by specific DCI format(s), e.g., a DCI format 0-1, a DCI format 0-2, a new DCI format, and/or a DCI format scrambled by a new RNTI. In one example, if the semi-static type is configured, the UE may configure a PUCCH switching configuration, and the configuration may include parameters, such as a PUCCH cell ID, a PUCCH cell group, a PUCCH cell list, a switching timing indication, and/or an enabling of the dynamic PUCCH carrier switching. In one example, if the dynamic type is configured, the UE may follow a MAC CE indication, and/or an DCI indication. Specifically, the switching timing indication may refer to the corresponding PUCCH carrier for each slot.

In one implementation, after switching from a first PUCCH carrier to a second PUCCH carrier, more than one UCI that is scheduled or configured to be transmitted with the PUCCH resources of the first PUCCH carrier are transmitted in the PUCCH resources of the second carrier for a period of time until switching back from the second PUCCH carrier to the first PUCCH carrier.

In one example, after switching from a first PUCCH carrier to a second PUCCH carrier, a HARQ-ACK that is scheduled to be transmitted in a PUCCH resource of the first PUCCH carrier is transmitted in a PUCCH resource of the second carrier. After the HARQ-ACK is transmitted, the UE may switch back from the second PUCCH carrier to the first PUCCH carrier.

For more detailed descriptions, the dynamic PUCCH carrier switching is introduced in the following. In one implementation, a duration between one given PDSCH and an associated PUCCH transmission (e.g., parameter K1) may apply a value based on a reference carrier with an SCS configuration $\mu$. More specifically, no matter which PUCCH carrier is scheduled, an indicated K1 value may be based on the reference carrier with SCS configuration $\mu$. Please refer to FIG. 2, which illustrates a schematic diagram for the parameter K1 based on the reference carrier according to an implementation of the present disclosure. As shown in the FIG. 2, if the reference carrier is carrier #0, then K1 may be '2' to indicate the corresponding PUCCH transmission even though one PUCCH is transmitted on the other carrier with a different SCS configuration.

In one example, the reference carrier may be configured by a higher layer. More specifically, a parameter, or/and a configuration may be used to indicate a serving cell ID as the reference carrier. In one example, the reference carrier may be indicated by a DCI format corresponding to one PUCCH transmission. More specifically, a field in the DCI may indicate a serving cell ID as the reference carrier, or the serving cell where the DCI is detected may be regarded as the reference carrier. In one example, the reference carrier may be indicated by a MAC CE. More specifically, a field in the MAC CE may indicate a serving cell ID as the reference carrier. Alternatively, a dedicated field may be used to indicate whether the reference cell is present. If this field is set to '1', the reference carrier ID is present. If this field is set to '0', the reference carrier is present. In one example, the SpCell and PUCCH-SCell (i.e., the serving cell configured by PUCCH-cell) may always be regarded as the reference cell.

Figure 3:
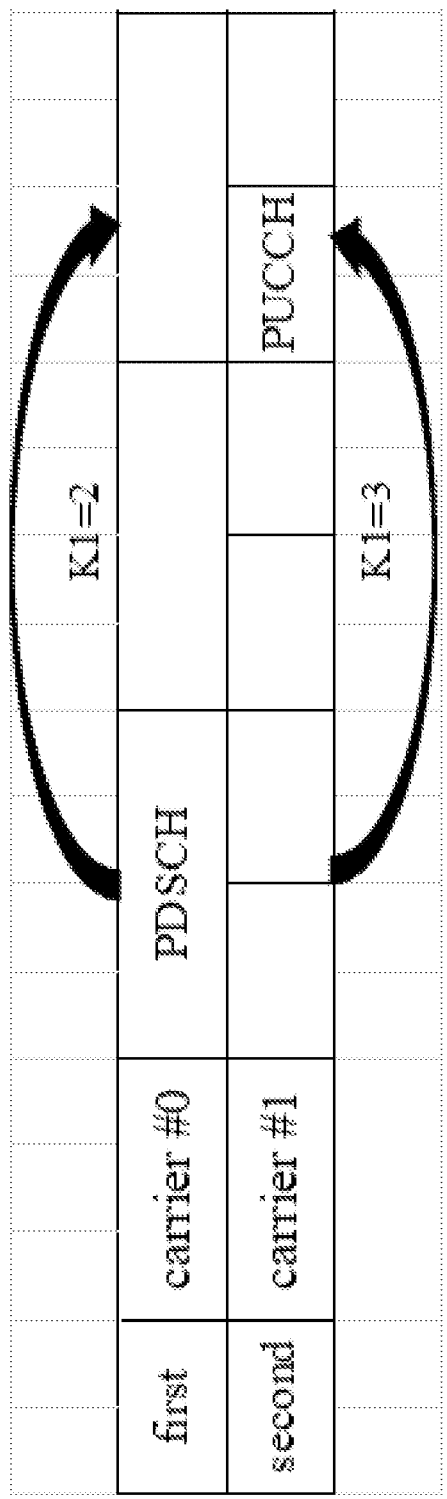
FIG. 3 illustrates a schematic diagram for the parameter K1 based on the first carrier according to an implementation of the present disclosure.

In one implementation, a first PUCCH carrier may be switched to a second PUCCH carrier. The first PUCCH carrier is with SCS configuration $\mu 1$, and the second PUCCH carrier is with SCS configuration $\mu 2$, the duration between one given PDSCH and an associated PUCCH transmission may be based on SCS configuration $\mu 1$. Please refer to FIG. 3, which illustrates a schematic diagram for the parameter K1 based on the first carrier according to an implementation of the present disclosure. As shown in the FIG. 3, if the first carrier is carrier #0, then K1 may be '2' to indicate the corresponding PUCCH transmission even though one PUCCH is transmitted on the second carrier with a different SCS configuration.

Figure 4:
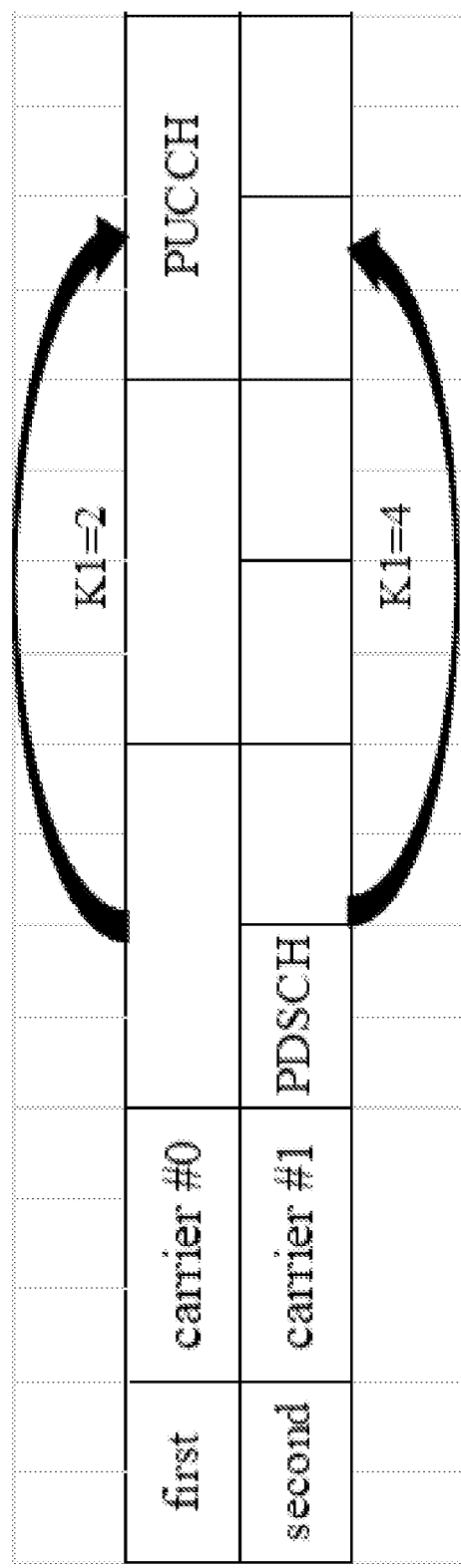
FIG. 4 illustrates a schematic diagram for the parameter K1 based on the second carrier according to an implementation of the present disclosure.

In one implementation, a first PUCCH carrier may be switched to a second PUCCH carrier. The first PUCCH carrier uses SCS configuration $\mu 1$, and the second PUCCH carrier uses SCS configuration $\mu 2$, the duration K1 between one given PDSCH and an associated PUCCH transmission may be based on SCS configuration $\mu 2$. More specifically, the SCS of the target carrier (e.g., PUCCH carrier after switching) may be used to interpret K1. As shown in the FIG. 3, if the first carrier is carrier #0 and the second carrier is carrier #1, then K1 may be '3' to indicate the corresponding PUCCH transmission. In another implementation, please refer to FIG. 4, which illustrates a schematic diagram for the parameter K1 based on the second carrier according to an implementation of the present disclosure. As shown in the FIG. 4, if the second carrier is carrier #1, then K1 value may be '4' to indicate the corresponding PUCCH transmission even though one PUCCH is transmitted on the first carrier with different SCS configuration.

Figure 5:
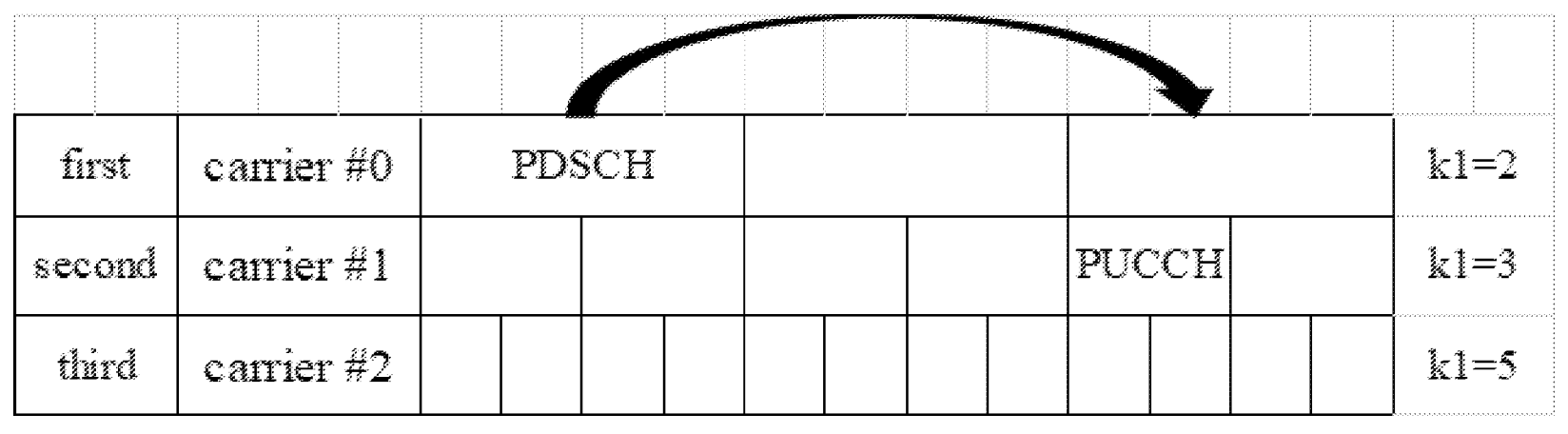

In one implementation, the duration K1 between one given PDSCH and an associated PUCCH transmission may be based on an active BWP in the serving cell with the smallest SCS configuration. Please refer to FIG. 5, which illustrates a schematic diagram for the parameter K1 based on a different SCS configuration according to an implementation of the present disclosure. As shown in the FIG. 5, K1 may be '5' to indicate the corresponding PUCCH transmission even though one PUCCH is transmitted on the second carrier with larger SCS configuration.

In one implementation, the duration K1 between one given PDSCH and an associated PUCCH transmission may be based on an active BWP in the serving cell with the largest SCS configuration. As shown in the FIG. 5, K1 may be '2' to indicate the corresponding PUCCH transmission even though one PUCCH is transmitted on the second carrier with smaller SCS configuration.

In one implementation, the duration K1 between one given PDSCH and an associated PUCCH transmission may be based on the SCS of the active BWP in the PUCCH carrier before switching. When the SCS of the active BWP in the PUCCH carrier after switching is larger than the SCS of the active BWP in the PUCCH carrier before switching, a PUCCH resource that is in a first UL slot in the PUCCH carrier after switching and overlaps the UL slot indicated by K1 in the PUCCH carrier before switching may be used if the PUCCH resource does not conflict with semi-static DL symbols or symbols used for SSB, and the PUCCH resource transmission starts after a duration Tproc,1 from the end of the PDSCH, where Tproc,1 is a parameter defined in TS 38.214 Section 5.3 (of 3GPP). Otherwise, a PUCCH resource that is in a second UL slot in the PUCCH carrier after switching and overlaps the UL slot indicated by K1 in the PUCCH carrier before switching may be used.

In one implementation, any one of the above implementations may be configurable and/or dynamically indicated.

For more detailed descriptions, the dynamic PUCCH carrier switching procedure is introduced in the following. In one implementation, if one UE detects a DCI format scheduling a PUCCH in a first PUCCH carrier that overlaps with another PUCCH or a PUSCH, the UE may not expect to switch the PUCCH carrier. More specifically, whenever the switching PUCCH carrier indication is received, the UE may ignore the switching PUCCH carrier indication if the overlapping PUCCHs or PUSCHs are scheduled even though the overlapping UL transmissions should be multiplexed together. In other words, the UE may not expect to perform UCI multiplexing when PUCCH carrier switching is indicated.

In one implementation, when the UE determines that there are overlapping PUCCH transmissions and/or overlapping PUSCH transmissions, the UE may check the availability of switching PUCCH carrier in advance. More specifically, the UE may expect to switch the PUCCH carrier before determining the overlapped UL transmission(s).

In one implementation, before determining whether to perform the PUCCH carrier switching, the UE may resolve the overlapping PUCCH transmission(s) by a UCI multiplexing procedure in advance. If the PUCCH resource is determined to carry multiplexed UCIs that conflict with semi-static DL symbols, the UE may perform the PUCCH carrier switching to transmit all or part of the multiplexed UCIs. After the PUCCH carrier switching, the UE may determine the PUCCH resource for use with the PUCCH carrier based on the payload size of all or part of the multiplexed UCIs.

In one implementation, when the UE receives one PUCCH carrier switching indication, a switching point may form/exist. Accordingly, the multiplexing procedure may be determined by the switching point. In one example, the definition of the switching point may start from the ending symbol of a last PDSCH reception, e.g., the last candidate PDSCH reception for which the UE may transmit corresponding HARQ-ACK information. In one example, the definition of the switching point may start from the ending symbol of the DCI that indicates the dynamic PUCCH carrier switching. In one example, the definition of the switching point may start from the starting symbol of the DCI that indicates the dynamic PUCCH carrier switching. In one example, the definition of the switching point may start from the starting symbol of the PUCCH transmission. In one example, the UE may expect that the switching point does not start before Tproc,2+d, which is a parameter defined in TS 38.214 Section 6.4 (of 3GPP), and after a last symbol of the DCI that indicates the dynamic PUCCH carrier switching, where 'd' may be '0', a symbol, a plurality symbols, or an absolute duration. In one example, the UE may expect that the switching starts before Tproc,2+d after a last symbol of the DCI that indicates the dynamic PUCCH carrier switching, where 'd' may be '0', a symbol, a plurality symbols, or an absolute duration. In one example, the UE may expect to resolve the overlapping UL transmissions before the switching point. In one example, the UE may not expect to be scheduled overlapping PUCCH transmissions after receiving a switching indication.

In one implementation, whether the UE performs PUCCH carrier switching may depend on whether more than one UCI with different priorities are multiplexed into one PUCCH. More specifically, if more than one multiplexing UCI with different priorities is allowed/indicated, the PUCCH carrier switching may not be scheduled. Alternatively, if more than one multiplexing UCI with different priorities is allowed/indicated, the PUCCH carrier switching may be scheduled.

In one implementation, when the UE receives the PUCCH carrier switching indication, a switching duration may exist (or be formed) for delay of operating the switching indication. In such a switching duration, the UE may not expect to be scheduled PDCCH receptions or UL transmissions.

Figure 6:
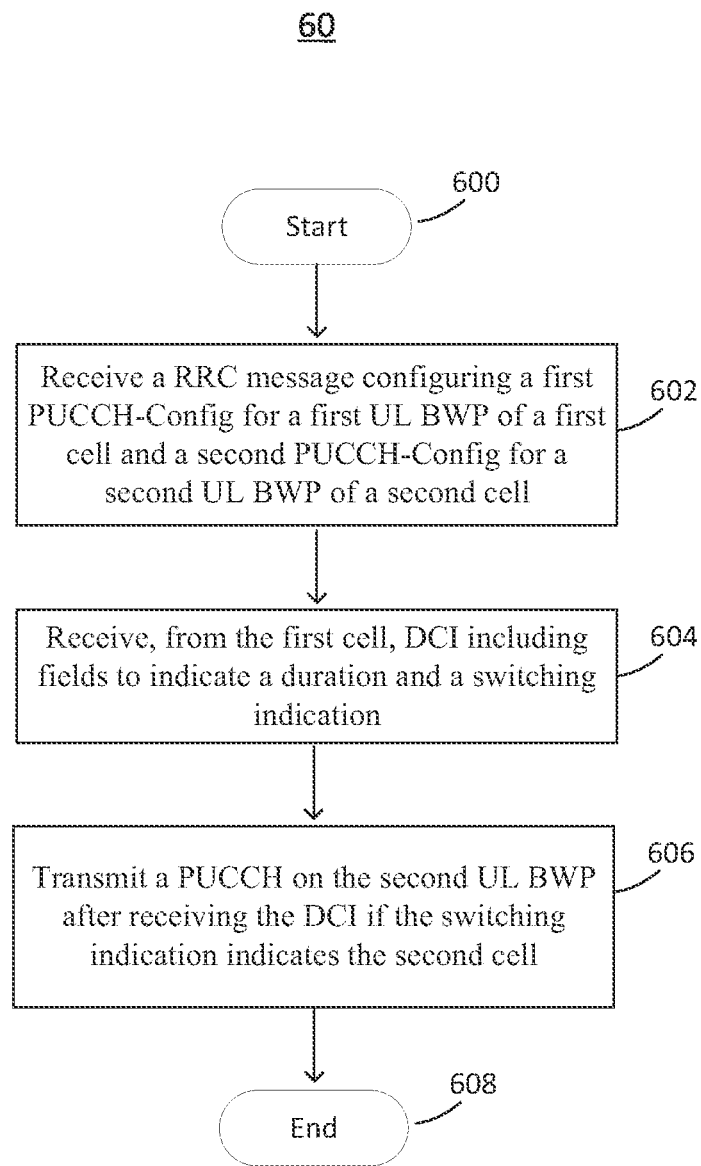
FIG. 6 illustrates a procedure for transmitting on different BWPs performed by a UE according to an implementation of the present disclosure.

Please refer to FIG. 6, which illustrates a procedure 60 for transmitting on different BWPs performed by a UE according to an implementation of the present disclosure. As shown in FIG. 6, the procedure 60 for the UE includes the following actions:

Action 600: Start.

Action 602: Receive a RRC message configuring a first PUCCH-Config for a first UL BWP of a first cell and a second PUCCH-Config for a second UL BWP of a second cell.

Action 604: Receive, from the first cell, DCI including fields to indicate a duration and a switching indication.

Action 606: Transmit a PUCCH on the second UL BWP after receiving the DCI if the switching indication indicates the second cell.

Action 608: End.

Preferably, action 602 to action 606 of the procedure 60 may be performed by the UE. In some implementations, the UE may receive the RRC message that is used to configure the first PUCCH-Config and the second PUCCH-Config in step 602, where the first PUCCH-Config is used for the first UL BWP of the first cell and the second PUCCH-Config is used for the second UL BWP of the second cell. In step 604, the UE may receive the DCI from the first cell, where the DCI may include the fields to indicate the duration and the switching indication, the switching indication indicates the second cell and the UE is capable of transmitting the PUCCH transmission on the second UL BWP after receiving the DCI. In step 606, if the switching indication indicates the second cell, the UE may transmit the PUCCH on the second UL BWP after receiving the DCI. Certain detailed mechanisms and/or operations (e.g., actions 602, 604 and 606) of the procedure 60 are described in above paragraphs and neglected hereinafter for brevity.

In some implementations, the duration indicates an offset between a PDSCH scheduled by the DCI and the PUCCH transmission in a time domain, and the duration is based on at least a SCS configuration for the second UL BWP. In some implementations, one of the fields of the DCI further indicates an ID of the second cell as the switching indication. In some implementations, the first cell is a PCell and the second cell is a SCell, and the first cell and the second cell are within a same PUCCH cell group.

In some implementations, the procedure 60 may further configure the UE to transmit a UE capability message to a BS/gNB of the first cell, in order to indicate whether the UE supports transmitting the PUCCH transmission on the second UL BWP.

Figure 7:
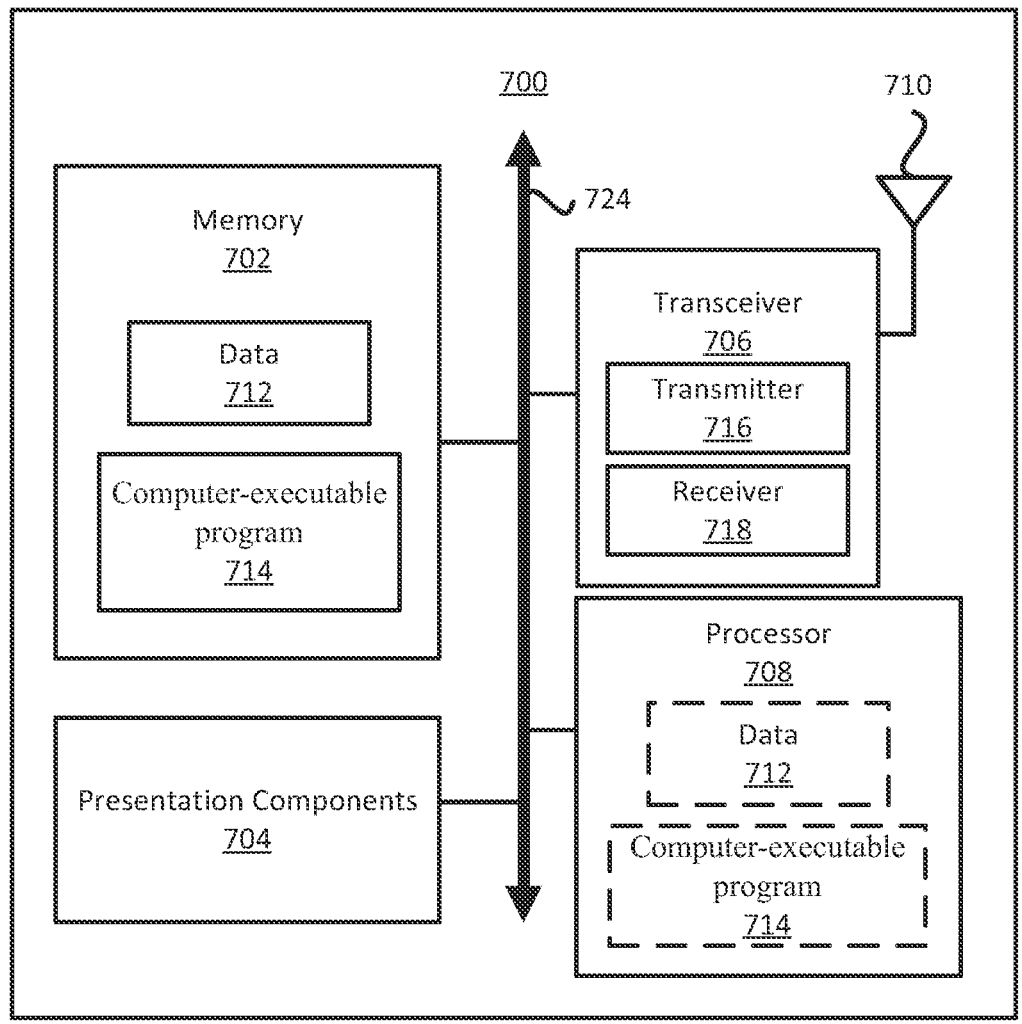
FIG. 7 illustrates a block diagram of a node for wireless communication according to an implementation of the present disclosure.

Please refer to FIG. 7, which illustrates a block diagram of a node 700 for wireless communication according to an implementation of the present disclosure. As illustrated in FIG. 7, the node 700 includes a transceiver 706, a processor 708, a memory 702, one or more presentation components 704, and at least one antenna 710. The node 700 may also include a Radio Frequency (RF) spectrum band module, a BS communications module, an NW communications module, and a system communications management module, input/output (I/O) ports, I/O components, and power supply (not explicitly illustrated in FIG. 7). Each of these components may be in communication with each other, directly or indirectly, over one or more buses 724. The node 700 may be a UE or a BS that performs various functions disclosed herein, for example, with reference to FIG. 6.

The transceiver 706 includes a transmitter 716 (e.g., transmitting/transmission circuitry) and a receiver 718 (e.g., receiving/reception circuitry) and may be configured to transmit and/or receive time and/or frequency resource partitioning information. The transceiver 706 may be configured to transmit in different types of subframes and slots, including, but not limited to, usable, non-usable and flexibly usable subframes and slot formats. The transceiver 706 may be configured to receive data and control channels.

The node 700 may include a variety of computer-readable media. Computer-readable media may be any available media that may be accessed by the node 700 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media.

The term "modulated data signal" may refer to a signal that has one or more of its characteristics set or changed in such a manner as to encode information in the signal. By way of example, and not limitation, communication media may include wired media such as a wired NW or direct-wired connection, and wireless media such as acoustic, RF, infrared and other wireless media. Combinations of any of the previous disclosure should also be included within the scope of computer-readable media.

The memory 702 may include computer-storage media in the form of volatile and/or non-volatile memory. The memory 702 may be removable, non-removable, or a combination thereof. For example, the memory 702 may include solid-state memory, hard drives, optical-disc drives, etc.

As illustrated in FIG. 7, the memory 702 may store a computer-executable (or readable) program 714 (e.g., software codes) that are configured to, when executed, cause the processor 708 to perform various functions disclosed herein, for example, with reference to FIG. 6. Alternatively, the computer-executable program 714 may not be directly executable by the processor 208 but may be configured to cause the node 700 (e.g., when compiled and executed) to perform various functions disclosed herein.

The processor 708 (e.g., having processing circuitry) may include an intelligent hardware device, a Central Processing Unit (CPU), a microcontroller, an ASIC, etc. The processor 708 may include memory. The processor 708 may process the data 712 and the computer-executable program 714 received from the memory 702, and information received via the transceiver 706, the baseband communications module, and/or the NW communications module. The processor 708 may also process information to be sent to the transceiver 706 for transmission through the antenna 710 to the NW communications module for subsequent transmission to a CN.

One or more presentation components 704 may present data to a person or other device. Examples of presentation components 704 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to specific implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A method performed by a User Equipment (UE) for Physical Uplink Control CHannel (PUCCH) transmission on different BandWidth Parts (BWPs) of different PUCCH cells, the method comprising:
receiving a radio resource control (RRC) message configuring a first PUCCH-Configuration (PUCCH-Config) for a first UpLink (UL) BWP of a primary PUCCH cell and a second PUCCH-Config for a second UL BWP of a secondary PUCCH cell;
receiving, from the primary PUCCH cell, Downlink Control Information (DCI) including fields that indicate a duration between a Physical Downlink Shared Channel (PDSCH) scheduled by the DCI and transmission of a Hybrid Automatic Repeat Request-Acknowledgement (HARQ-ACK) on a PUCCH and a switching between the primary PUCCH cell and the secondary PUCCH cell; and
transmitting the PUCCH on the second UL BWP of the secondary PUCCH cell after receiving the DCI when the switching indicates switching the PUCCH transmission from the primary PUCCH cell to the secondary PUCCH cell, wherein:
the primary PUCCH cell and the secondary PUCCH cell are within a same PUCCH cell group.

2. The method of claim 1, wherein the duration is based on at least a Sub-Carrier Spacing (SCS) configuration of the second UL BWP.

3. The method of claim 1, further comprising:
transmitting a UE capability message to indicate whether the UE supports transmitting the PUCCH on the second UL BWP after receiving the DCI.

4. The method of claim 1, wherein one of the fields of the DCI further indicates an Index (ID) of the secondary PUCCH cell as the cell for the switching.

5. A User Equipment (UE) in a wireless communication system for Physical Uplink Control CHannel (PUCCH) transmission on different BandWidth Parts (BWPs) of different PUCCH cells, the UE comprising:
at least one processor; and
at least one non-transitory computer-readable medium storing one or more computer-executable instructions that, when executed by the at least one processor, cause the UE to:
receive a radio resource control (RRC) message configuring a first PUCCH-Configuration (PUCCH-Config) for a first UpLink (UL) BWP of a primary PUCCH cell and a second PUCCH-Config for a second UL BWP of a secondary PUCCH cell;
receive, from the primary PUCCH cell, Downlink Control Information (DCI) including fields that indicate a duration between a Physical Downlink Shared Channel (PDSCH) scheduled by the DCI and transmission of a Hybrid Automatic Repeat Request-Acknowledgement (HARQ-ACK) on a PUCCH and a switching between the primary PUCCH cell and the secondary PUCCH cell; and
transmit the PUCCH on the second UL BWP of the secondary PUCCH cell after receiving the DCI when the switching indicates switching the PUCCH transmission from the primary PUCCH cell to the secondary PUCCH cell, wherein:
the primary PUCCH cell and the secondary PUCCH cell are within a same PUCCH cell group.

6. The UE of claim 5, wherein the duration is based on at least a Sub-Carrier Spacing (SCS) configuration of the second UL BWP.

7. The UE of claim 5, wherein the computer-executable instructions, when executed by the at least one processor, further cause the UE to:
transmit a UE capability message to indicate whether the UE supports transmitting the PUCCH on the second UL BWP after receiving the DCI.

8. The UE of claim 5, wherein one of the fields of the DCI further indicates an Index (ID) of the secondary PUCCH cell as the cell for the switching.

* * * * *